3,203,981
OXYGENATED TERTIARY-ALKYLAMINES
William W. Hargrove, Indianapolis, Ind., assignor to Eli
  Lilly and Company, Indianapolis, Ind., a corporation
  of Indiana
No Drawing. Filed Dec. 26, 1961, Ser. No. 162,250
5 Claims. (Cl. 260—501)

This invention relates to oxygenated tertiary-alkylamines. More particularly, it relates to di-tertiary-alkylamines containing an aldehyde group, an hydroxyl group, an ester group or a carboxylic acid group.

In the past, it has been extremely difficult to prepare di-tertiary-alkylamines containing a functional group in one of the tertiary-alkyl radicals. A chief cause of this difficulty is the fact that tertiary-alkyl halides cannot be used to alkylate an amine group since the reaction of a tertiary halide and a basic substance, such as an amine, yields exclusively an ethylenic hydrocarbon by the elimination of the elements of a hydrogen halide from the tertiary-alkyl halide. Furthermore, and for the same reason, di-tertiary-alkylamines themselves (see, for example, p. 59, "Organic Chemistry," by Fieser and Fieser, 2d Edition, Reinhold) have been readily available only in recent years. The reduction of a tertiary-alkylamino-acetylene, by the method of Hennion and Nelson, J. Am. Chem. Soc., 79, 2142 (1957), has provided di-t-alkylamines in which one of the alkyl groups could be a t-butyl group. However, this synthetic method is not available for the preparation of di-t-butylamine itself, since a t-amyl radical is the smallest radical preparable by the reduction of an amino acetylene. Considerable interest has been generated in finding better synthetic methods for di-t-alkylamines since di-t-butylamine and N-t-butyl t-amylamine are both powerful hypotensive agents.

It is the object of this invention to provide novel tertiary-alkylamines having a functional group attached to one of the tertiary-alkyl groups. It is a further object of this invention to provide novel intermediates for the synthesis of di-t-butylamine. Other objects of this invention will become apparent from the following disclosure.

The compounds provided by this invention can be represented by the following structure

(I)

wherein R is a tertiary-alkyl group, R' is hydrogen, methyl, or ethyl, R" is a primary alcohol group (—CH₂OH), an aldehyde group (—CHO), a carboxylic acid group (—COOH) or a carboxylic ester group (—COOalk), and alk is a lower alkyl group. The acid addition salts of the above amines are also included within the scope of this invention.

In the above Formula R represents a tertiary-alkyl group such as t-butyl, t-amyl, 3-methyl-3-pentyl, 3-ethyl-3-hexyl, 2-methyl-2-pentyl, 3-ethyl-3-pentyl, 2,3-dimethyl-2-hexyl, 2,3-dimethyl-3-hexyl, 2,4-dimethyl-2-hexyl, 2-methyl-2-heptyl, 2,4-dimethyl-2-hexyl, 2-ethyl-2-hexyl, 2,3,4-trimethyl-3-pentyl, 2-methyl-2-hexyl and the like. Alk in the above formula represents a lower alkyl group having from 1 to 5 carbon atoms, as for example methyl, ethyl, n-propyl, isopropyl, isobutyl, n-amyl, iso-amyl, sec-butyl, n-butyl, 3-methylbutyl and the like.

The acid addition salts of this invention are prepared by dissolving the free base in a solvent and adding thereto a solution containing an equivalent amount of an acid. If ether is used as a solvent, the acid addition salt is usually insoluble therein and can be isolated by filtration. If, on the other hand, a solvent such as ethanol is used in which the acid addition salt of the amine is soluble, the salt is isolated by evaporation of the solvent. As is well known in the art, salts of acids which can be obtained in gaseous form, such as hydrogen chloride, can also be prepared by bubbling the gaseous acid into a solution of the amine. The resulting salt is, as before, isolated according to whether it is soluble or insoluble in the solvent employed.

Illustrative acids which can be used to prepare the acid addition salts of the amines of the invention include: inorganic acids such as hydrochloric acid, hydrobromic acid, sulfuric acid, nitric acid, phosphoric acid, and the like, as well as organic acids such as acetic acid, trichloroacetic acid, benzoic acid, 2,4-dinitrobenzoic acid, maleic acid, citric acid, succinic acid, tartaric acid, phthalic acid, and the like.

Illustrative compounds represented by the above formula include:

α-t-Butylamino-α-methylpropionaldehyde hydrochloride
α-t-Butylamino-α,β-dimethylbutyraldehyde succinate
α-t-Amylamino-α,β,β-trimethylbutyric acid
Ethyl α-(3-ethyl-3-pentylamino)-α-ethyl-1-butyrate hydrobromide
Propyl α-(2-ethyl-2-hexylamino)-α-methylpropyionate nitrate
N-methyl-N-t-butyl α-amino-α-methylheptaldehyde benzoate
N-ethyl-N-t-butyl α-amino-α-methylcaproic acid Compounds represented by the above formula in which R" is an aldehyde or a carboxylic acid group are prepared by the ozonization of a compound represented by the following formula

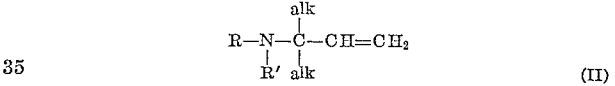

(II)

wherein R, R' and alk have the same significance as before. In this procedure the aminoethylene is subjected to the action of ozone at sub-zero temperatures, preferably in the range from about −20° C. to about −78° C. The resulting ozonide can then be decomposed either under reducing conditions to yield an amino-aldehyde or under oxidizing conditions to yield an amino-acid. As will be understood by those skilled in the art, the aldehyde is readily converted to the acid by the action of oxygen and in actual practice, precautions are necessary to prevent such an oxidation during the isolation of the aldehyde, particularly considering that excess ozone and hydroperoxides as well as other oxidizing agents, are present during both the ozonization process and the isolation process.

Compounds represented by the above formula in which R" is a primary alcohol group are prepared by reduction of the aldehyde using sodium borohydride, lithium aluminum hydride or catalytic hydrogenation.

Compounds represented by the above formula in which R" is an ester group are prepared by esterification of the corresponding carboxylic acid according to the methods of the prior art.

While the above procedures will yield all of the compounds of this invention, an alternative route is available for the syntheses of compounds in which R' is methyl or ethyl. One of these synthetic routes involves the ozonization of an amino-ethylene in which both of the hydrogens on the nitrogen are substituted by alkyl groups. The alternate synthetic route involves the alkylation of a tertiary-alkylamino aldehyde, alcohol, acid or ester by the use of dimethyl sulfate, diethyl sulfate, methyl p-toluenesulfonate, etc.

The synthesis of the tertiary-alkylamino-ethylene starting materials of this invention can be readily accomplished by the semi-hydrogenation of the corresponding tertiary-alkylamino-acetylene, using a procedure described in the co-pending application of N. R. Easton and E. C. Kornfeld, Serial No. 861,167, field November 25, 1959, Patent No. 3,067,101.

The compounds of this invention are useful as intermediates. For example a compound represented by the above Formula I in which R" is an aldehyde group can be reduced to the corresponding compound in which a methyl group has replaced the aldehyde. Likewise, those compounds in which R" is an alcohol group can be converted to the corresponding compound having a methyl group by reductive processes. In addition, compounds in which R" is an aldehyde, an acid, or an ester grouping, can be reduced to the corresponding alcohol. Furthermore, the alcohol group can be oxidized to an aldehyde or an acid.

The di-tertiary-alkylamines prepared by reductive processes from the aldehyde or alcohol, as set forth above, are useful as hypotensive agents, their hypotensive action being provided via ganglionic blockade. Surprisingly, compounds represented by the above formula in which R" is an alcohol or an aldehyde group have considerable hypotensive activity of their own as shown by tests in standard laboratory animals. Particularly active in this regard are α-t-butylamino-α-methylpropionaldehyde and α-t-butylamino-α-methyl-1-propanol.

This invention is further illustrated by the following specific examples.

EXAMPLE 1.—PREPARATION OF α-t-BUTYLAMINO-α-METHYLPROPIONALDEHYDE

Twenty grams of 3-t-butylamino-3-methyl-1-butene hydrochloride were dissolved in 200 ml. of chloroform and the solution was placed in a 3-liter, 3-neck, round-bottom flask equipped with a gas delivery tube, a thermometer and a calcium chloride drying tube. The solution was cooled to about —5° C. and ozone was passed through the cooled solution for 4½ hours at the rate of about 0.55 millimole per minute. Dissolved ozone was swept from the reaction mixture with oxygen. The gas delivery tube was replaced by a stirrer and eight grams of zinc dust were added in small portions to the reaction mixture while maintaining the temperature of the stirred solution at about —5° C. Next 5 ml. of glacial acetic acid were added. The resulting mixture was stirred for an additional 30 minutes and was filtered. The filtrate was mixed with an equal volume of water, thus causing the formation of a white precipitate. Five percent aqueous potassium hydroxide was added dropwise to the mixture until the white precipitate disappeared. The chloroform layer was separated and the aqueous alkaline layer was extracted with two additional 100 ml. portions of chloroform. The chloroform extracts were combined, were washed once with an equal volume of water, and were dried. The chloroform was removed by evaporation in vacuo, leaving as a residue α-t-butylamino-α-methylpropionaldehyde. Distillation of the residue yielded purified α-t-butylamino-α-methylpropionaldehyde boiling in the range 75–80° C. at a pressure of about 55 mm. of Hg.

α-t-Butylamino-α-methylpropionaldehyde thus formed was dissolved in ethyl acetate. An excess of ethanolic hydrogen chloride was added and the solvents were removed by evaporation in vacuo leaving as a residue α-t-butylamino-α-methylpropionaldehyde hydrochloride. The compound melted at about 215° C. with decomposition after recrystallization from methyl ethyl ketone.

*Analysis.*—Calc.: N, 7.80. Found: N, 7.69.

EXAMPLE 2.—PREPARATION OF α-t-BUTYLAMINO-α-ETHYLBUTYRALDEHYDE

Fifteen grams of 3-t-butylamino-3-ethyl-1-pentene hydrochloride were dissolved in 300 ml. of anhydrous methanol. The solution was placed in a 1-liter, 3-neck, round-bottom flask equipped with a gas delivery tube and a calcium chloride drying tube. The solution was cooled to about —78° C. Ozone was passed through the solution at the rate of about 0.55 millimole per minute for a period of about 5 hours, after which time excess ozone was swept from the solution with oxygen. The oxygen was in turn swept out of the reaction flask with nitrogen. Fifteen ml. of trimethyl phosphite were added to the reaction mixtures at the rate of 1 drop per second. After the addition had been completed, the reaction mixture was maintained at —78° C. for a period of about 14 hours and was then allowed to warm up to ambient room temperature. A mixture of 20 ml. of water and 5 ml. of 12 N hydrochloric acid were added. The solvents were removed by evaporation in vacuo leaving a syrupy residue of α-t-butylamino-α-ethylbutyraldehyde hydrochloride. About 100 ml. of water were added to the residue and sufficient solid sodium carbonate was added to saturate the water layer. During this operation the α-t-butylamino-α-ethylbutyraldehyde hydrochloride was converted to the free base which was insoluble in the aqueous alkaline layer and was extracted with 3 successive 100-ml. portions of ether. The aqueous layer was then made strongly basic by the addition of 40 percent (w./v.) aqueous sodium hydrochloride and a final 100 ml. ether extraction was made. The ether extracts were combined and were washed with 100 ml. of water. The ether was removed by disillation at atmospheric pressure. Benzene was added to the resulting residue. Distillation of the benzene served to dry the free base by removing the residual water as the benzene-water azeotrope. Removal of the last traces of benzene by distillation yielded a residue of α-t-butylamino-α-ethylbutyraldehyde.

α-t-Butylamino-α-ethylbutyraldehyde thus prepared was dissolved in ethyl acetate and an excess of ethanolic hydrogenchloride was added, thus forming α-t-butylamino-α-ethylbutyraldehyde hydrochloride. The solvents were removed by evaporation in vacuo, and the hydrochloride salt remaining a residue was recrystallized from ethyl acetate. The α-t-butylamino-α-ethylbutyraldehyde hydrochloride melted at about 154–55° C. after recrystallization from methyl ethyl ketone.

Following the above procedure, 3-t-butylamino-3-methyl-1-pentene hydrochloride was ozonized to yield α-t-butylamino-α-methylbutyraldehyde. Its hydrochloride salt melted at about 159–160.5° C.

N-t-butyl-N-methyl 3-amino-3-methyl-1-butene hydrochloride was ozonized in methanol at about 78° C. according to the above procedure to yield N-t-butyl-N-methyl-3-amino-3-methylpropionaldehyde. The free base was converted to the hydrochloride salt by the procedure of Example 1. Infrared spectral analysis of a chloroform solution of the hydrochloride salt demonstrated the presence in the amine base of the expected aldehyde group.

EXAMPLE 3.—PREPARATION OF α-t-BUTYLAMINO-α-METHYL-1-PROPANOL 1.65 grams of α-t-butylamino-α-methylpropionaldehyde were dissolved in a minimal amount of 70 percent aqueous methanol, and the resulting solution was added to a cooled solution of 4 grams of sodium borohydride in a mixture of 40 ml. of methanol and 40 ml. of water. After the addition of the aldehyde had been completed, the cooling means were removed and the reaction mixture was stirred until it had warmed to ambient room temperature. The reaction mixture was allowed to remain at ambient room temperature for about 14 hours and was then heated to refluxing temperature for about 1.5 hours. The reaction mixture was made acidic by the addition of 12 N hydrochloric acid and the methanol was removed by evaporation in vacuo. The aqueous acidic layer was made basic by the dropwise addition of 40 percent (w./v.) aqueous sodium hydrochloride, thus liberating α-t-butylamino-α-methyl-1-propanol free base. The free base, being insoluble in the alkaline layer, separated and was extracted with three 50-ml. portions of ether. The ether extracts were combined and were dried.

The ether was removed by evaporation in vacuo leaving as a residue α-t-butylamino-α-methyl-1-propanol.

α-t-Butylamino-α-methyl-1-propanol free base thus prepared was dissolved in ethyl acetate and an excess of ethanolic hydrogen chloride was added, thus forming the corresponding hydrochloride salt, which melted at about 203–204° C. after recrystallization from methyl ethyl ketone.

*Analysis.*—Calc.: N, 7.71. Found: N, 7.99.

EXAMPLE 4.—PREPARATION OF N-t-BUTYL-α-METHYLALANINE

The procedure of Example 1 was followed except that the reaction mixture employed in the ozonization consisted of 100 ml. of glacial acetic acid, 100 ml. of ethyl acetate and 32.18 grams of 3-t-butylamino-3-methyl-1-butene. The addition of zinc to the ozonization mixture was carried out as set forth in Example 1 except that it was not necessary to add excess glacial acetic acid after the zinc had been added, since the acid had been used as one of the solvents in the ozonization mixture. After the zinc dust addition had been completed, about 20 ml. of water were added to the reaction mixture. The residual zinc dust was separated by filtration and the filtrate was evaporated to dryness, leaving an amber-colored residue comprising N-t-butyl-α-methylalanine. The residue was dried by the addition of acetic anhydride. The excess acetic anhydride was evaporated in vacuo along with any acetic acid formed by the reaction of acetic anhydride with water. The dried residue was dissolved in benzene and the benzene solution was chilled at 0° C. for 48 hours, during which time a white crystalline substance comprising N-t-butyl-α-methylalanine precipitated. The precipitate was separated by filtration and was then placed in the thimble of a Soxhlet extractor. The solid was extracted over night with methyl ethyl ketone. The methyl ethyl ketone extract was discarded. The solid in the Soxhlet thimble was next extracted with chloroform over night and the chloroform extract was also discarded. The solid material remaining in the Soxhlet thimble was dissolved in about 500 ml. of water. Hydrogen sulfide gas was pasesd into the solution, thus precipitating zinc sulfide. The zinc sulfide was separated by filtration and the operation was repeated upon the filtrate until no further zinc sulfide precipitate was obtained. The zinc-free aqueous filtrate was evaporated to dryness in vacuo, leaving N-t-butyl-α-methylalanine as a residue. Recrystallization of the residue from a methyl ethyl ketone-methanol solvent mixture yielded N-t-butyl-α-methylalanine melting at about 225–226° C.

To prepare lower alkyl esters of N-t-butyl-α-methylalanine, the amino acid is dissolved in a minimum quantity of ethanol, and an excess of ethanol saturated with gaseous hydrogen chloride is added to the solution. The resulting reaction mixture is heated under refluxing temperature for about 5 hours and is then cooled. Evaporation of the solvent in vacuo leaves as a residue the ethyl ester of N-t-butyl-α-methylalanine as a hydrochloride salt.

Other lower alkyl esters of N-t-butyl-α-methylalanine can be prepared in an entirely analogous fashion by substituting the desired alcohol for ethanol in the above procedure.

The preparation of the tertiary-alkylamino-ethylenes useful as starting materials in this invention is illustrated in the following preparative procedures.

Preparation 1.—Preparation of 3-t-butylamino-3-ethyl-1-pentene 8.35 grams of 3-t-butylamino-3-ethyl-1-pentyene were dissolved in 50 ml. of ethanol and were hydrogenated at low pressure using 2 grams of a heavy suspension of Raney nickel in ethanol as a catalyst. After the uptake of hydrogen had ceased, the hydrogenation mixture was removed from the apparatus and was filtered to remove the catalyst. 3-t-butylamino-3-ethyl-1-pentene formed in the above reaction was isolated as the hydrochloride salt by adding cold 12 N hydrochloric acid dropwise to the filtrate until the filtrate became acid. Evaporation of the ethanol left the hydrochloride salt as a crystalline residue. Recrystallization of the residue from a mixture ethyl acetate and isopropanol yielded 3-t-butylamino-3-ethyl-1-pentene hydrochloride melting at about 183–184° C.

*Analysis.*—Calc.: C, 64.20; H, 11.76; N, 6.81. Found: C, 64.32; H, 11.50; N, 6.87.

3-t-butylamino-3-ethyl-1-pentene hydrochloride was dissolved in water and the aqueous solution was made alkaline to litmus by the addition of cold 50 percent sodium hydroxide, thus forming 3-t-butylamino-3-ethyl-1-pentene free base. The free base was insoluble in the alkaline layer, and was extracted into ether. The ether extract was separated and was dried. The ether was removed by distillation at atmospheric pressure, leaving a residue comprising 3-t-butylamino-3-ethyl-1-pentene. The residue was distilled, and 3-t-butylamino-3-ethyl-1-pentene boiled at about 78° C. at a pressure of 18 mm. of Hg; $n_D^{25}=1.443$.

*Analysis.*—Calc.: N, 8.27. Found: N, 8.11.

Preparation 2.—Preparation of 3-t-butylamino-3-methyl-1-butene

Seven grams of 3-t-butylamino-3-methyl-1-butyne were dissolved in 200 ml. of methylcyclohexane. Thirty mg. of 5 percent palladium-on-carbon were added as a hydrogenation catalyst. The mixture was placed in a low-pressure hydrogenation apparatus and was semi-hydrogenated. After the theoretical quantity of hydrogen had been absorbed, the mixture was removed from the apparatus and filtered to remove the catalyst. Anhydrous hydrogen chloride gas was bubbled into the filtrate. 3-t-butylamino-3-methyl-1-butene hydrochloride was formed and precipitated. The precipitate was isolated by filtration. The product, after recrystallization from a mixture of ethyl acetate and isopropanol, melted at about 202–204° C.

*Analysis.*—Calc.: N, 7.88. Found: N, 7.73.

Preparation 3.—Preparation of 3-t-butyl-amino-3-methyl-1-pentene 15.3 grams of 3-t-butylamino-3-methyl-1-pentyene were dissolved in hexane and were semi-hydrogenated using as a catalyst 0.075 gram of 5 percent palladium-on-barium carbonate. The semi-hydrogenation required only about 35 minutes to go essentially to completion, as evidenced by the drop in hydrogen pressure from an initial reading of 43.8 p.s.i. to a steady reading of 8.4 p.s.i. The catalyst was separated by filtration, and the 3-t-butylamino-3-methyl-1-pentene, formed in the semi-hydrogenation, was purified by distillation. The compound boiled at about 67° C. at a pressure of 25 mm. of Hg; $n_D^{25}=1.437$.

*Analysis.*—Calc.: N, 9.02. Found: N, 9.06.

Following the procedure of preparation 1, 3-t-butyl-amino-3-methyl-1-pentene hydrochloride was prepared from the free base. It melted at about 164–166° C.

*Analysis.*—Calc.: C, 62.64; H, 11.57; N, 7.30. Found: C, 62.50; H, 11.59; N, 7.38.

Preparation 4.—Preparation of N-methyl-N-t-butyl-3-amino-3-methyl-1-butene

Eighteen grams of 3-t-butylamino-3-methyl-1-butene were mixed with 12.6 grams of dimethyl sulfate and 14 grams of solid potassium carbonate. After the initial spontaneous exothermic reaction had subsided, the reaction mixture was heated for three hours at about 65° C. The reaction mixture was cooled and was made basic by the addition of 40 percent (w./v.) aqueous sodium hydroxide. N - methyl - N - t - butyl-3-amino-3-methyl-1-butene, formed in the above reaction, was insoluble in the aqueous alkaline layer and was extracted into ether. The ether solution was dried and the ether was removed by boiling. Distillation of the residue yielded N-methyl-N-t-butyl-3-amino-3-methyl-1-butene boiling in the range 80–85° C. at a pressure of about 55 mm. of Hg; $n_D^{25} = 1.439$.

The picrate salt of the free base was formed. It melted at about 142° C. with decomposition.

*Analysis.*—Calc.: C, 49.95; H, 6.69; N, 14.58. Found: C, 49.96; H, 6.22; N, 14.85.

N-methyl-N-t-butyl-3-amino-3-methyl-1-butene free base was converted to the hydrochloride salt by dissolving the free base in ethanol, saturating the ethanolic solution with gaseous hydrogen chloride, and then precipitating the hydrochloride salt by the addition of ether. The N-methyl-N-t-butyl-3-amino-3-methyl-1-butene hydrochloride, thus formed melted at about 127° C.

I claim:

1. An amine base of the formula:

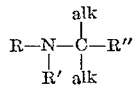

wherein R is a tertiary alkyl group, R' is a member of the class consisting of hydrogen, methyl, and ethyl, R'' is a member of the group consisting of —CH$_2$OH and CHO, and alk is a lower alkyl group.

2. A non-toxic acid addition salt of a compound according to claim 1.

3. α-t-Butylamino-α-methylpropionaldehyde.

4. α-t-Butylamino-α-ethylbutyraldehyde.

5. α-t-Butylamino-α-methyl-1-propanol.

References Cited by the Examiner
UNITED STATES PATENTS

| | | |
|---|---|---|
| 1,824,676 | 9/31 | Mannich. |
| 2,500,317 | 3/50 | Lincoln _____ 260—534 XR |
| 2,744,141 | 5/56 | Hayes et al. _____ 260—584 |
| 2,969,359 | 1/61 | Benneville. |

OTHER REFERENCES

Bowman, J. Chem. Soc., 1950, pages 1346–49.

LORRAINE A. WEINBERGER, *Primary Examiner.*

LEON ZITVER, *Examiner.*